Aug. 18, 1931.   H. A. CLARK   1,819,871
OIL SEAL
Filed July 9, 1928   3 Sheets-Sheet 1
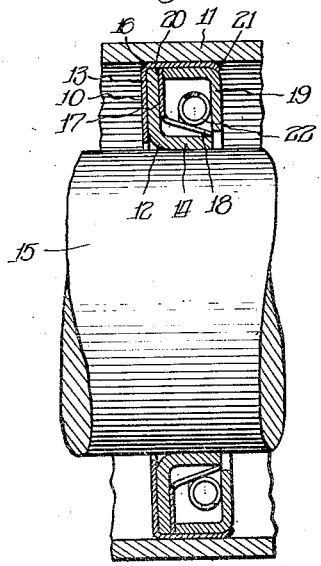
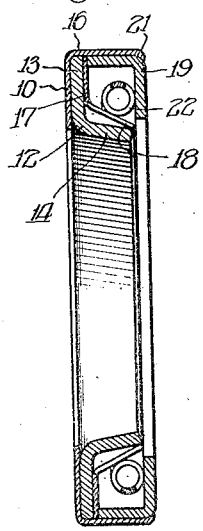
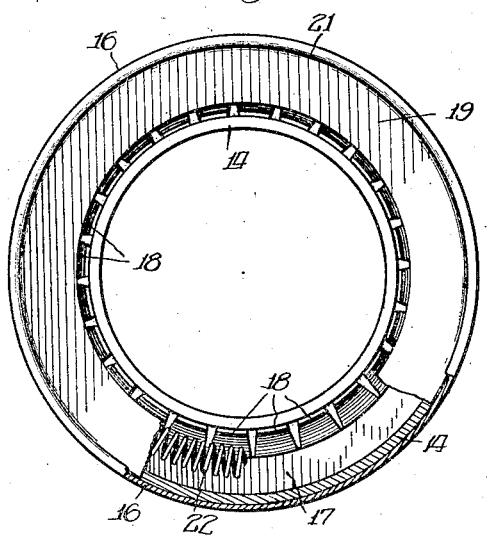
Inventor:
Harold A. Clark,
By Cromwell, Greist & Warden
attys.

Aug. 18, 1931.   H. A. CLARK   1,819,871
OIL SEAL
Filed July 9, 1928   3 Sheets-Sheet 2
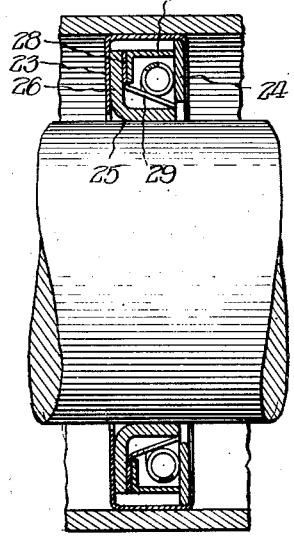
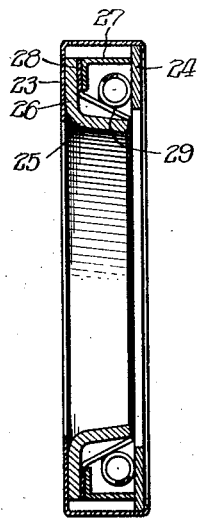
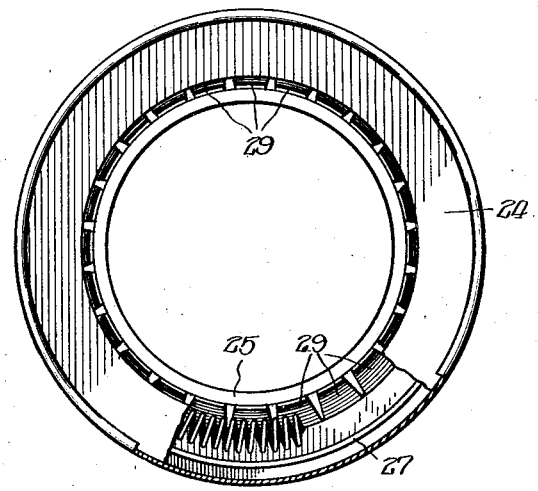
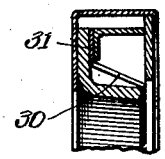
Inventor:
Harold A. Clark, Aug. 18, 1931. H. A. CLARK 1,819,871
OIL SEAL
Filed July 9, 1928  3 Sheets-Sheet 3
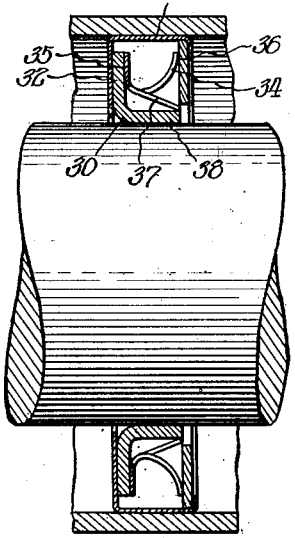
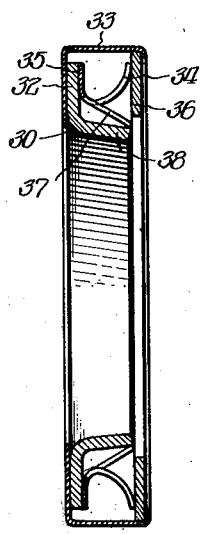
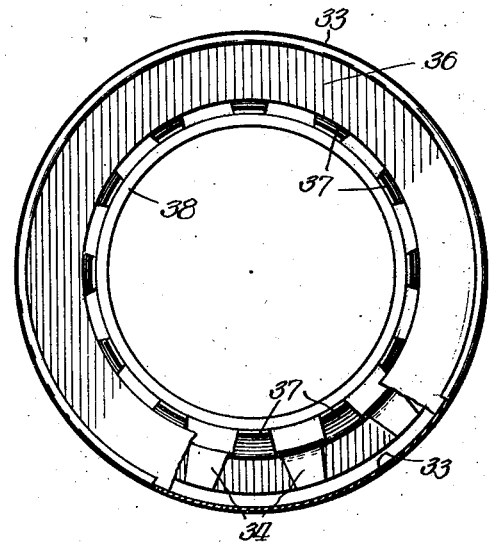
Inventor:
Harold A. Clark, Patented Aug. 18, 1931

1,819,871

UNITED STATES PATENT OFFICE

HAROLD A. CLARK, OF NORTHBROOK, ILLINOIS, ASSIGNOR TO CHICAGO RAWHIDE MANUFACTURING CO., OF CHICAGO, ILLINOIS, A CORPORATION OF ILLINOIS

OIL SEAL

Application filed July 9, 1928. Serial No. 291,164.

The invention relates to oil seals of the type disclosed in my Patent No. 1,674,762 and in my copending application for patent Serial No. 288,093.

One object of the invention is to provide a seal in which the pressure applied to the packing by the spring is localized at that point on the packing where it will have the greatest effect.

Another object is to provide a seal structure in which the casing is composed of two inversely nested sheet metal cup members and the packing is compressed between the bottom of one of the cups and a pressure distributing ring engaged by the rim of the other cup.

While the foregoing statements are indicative in a general way of the nature of the invention, other objects and advantages will be apparent upon a full understanding of the construction, arrangement and operation of the seal.

In order that the invention may be readily understood, several different forms are herein illustrated and described, but it will of course be appreciated that the invention is susceptible of embodiment in other structurally modified forms coming equally within the scope of the appended claims.

In the drawings:

Fig. 1 is a diametric section through the seal, showing the seal positioned within a housing about a rotating shaft;

Fig. 2 is another diametric section, showing the seal before application to the shaft;

Fig. 3 is an end view of the seal, with portions broken away to show the interior construction;

Figs. 4, 5 and 6 are views corresponding to Figs. 1, 2 and 3, showing another form of the seal;

Fig. 7 is a fragmentary view corresponding to the upper portion of Fig. 5, showing still another form of the seal; and Figs. 8, 9 and 10 are views corresponding to Figs. 1, 2 and 3, showing still another form of the seal.

The seal shown in Figs. 1, 2 and 3 consists of a centrally apertured cup-shaped cage member 10 which is adapted to be positioned in fluid-tight association with a tubular housing 11, a packing 12 of leather or other suitable material having a radially flanged portion 13 in fluid-tight association with the bottom of the cage member 10 and an axially sleeved portion 14 which is adapted to be positioned in rotatable fluid-tight association with a shaft 15, a pressure-localizing member 16 having a flat annular portion 17 positioned against the radially flanged portion 13 of the packing and a number of centrally converging fingers 18 which bear against the axially sleeved portion of the packing at a point adjacent the edge of the same, a second centrally apertured cup-shaped cage member 19 which is nested within the cage member 10 in inverted relation with the edge 20 of the same positioned under pressure against the pressure-localizing member 16, in which position the cage member 19 is permanently secured by a spun-over edge 21 on the cage member 10, and an endless coil spring 22 positioned under tension about the fingers 18 of the pressure-localizing member.

When the above described seal is applied to a shaft, the axially sleeved portion 14 of the packing is distended by the shaft from the position shown in Fig. 2 to the position shown in Fig. 1, and the fingers 18 of the pressure-localized member, together with the spring 22, are forced outwardly a corresponding distance. The resiliency of the spring serves to constrict the axially sleeved portion of the packing snugly about the shaft rotating therein, and the pressure applied by the spring to the axially sleeved portion of the packing is localized by the fingers 18 at a point adjacent the edge of the axially sleeved portion, resulting in a most effective application of the spring pressure.

The pressure-localizing member 16 is a thin sheet metal stamping. If desired, it may be made up as a spring, whereby to supplement the action of the coil spring. In this case, the fingers 18 of the pressure-localizing member would tend at all times to assume the position shown in Fig. 2, in order that, when distended to the position shown in Fig. 1, they would press inwardly against the packing.

The seal shown in Figs. 4, 5 and 6 differs primarily from that shown in Figs. 1, 2 and 3 in that one of the cage members 23 and 24 is in the form of a flat washer, the radially flanged portion 25 of the packing 26 is of less diameter than the inside of the cage member 23 in order to shift radially therein while maintained in fluid-tight association with the bottom of the cage member 23, and a spacing member 27 is positioned under compression between the washer 24 and the flat annular portion 28 of the pressure-localizing member 29. The spacing member 27 and the pressure-localizing member 28, like the radially flanged portion 25 of the packing, are of less diameter than the inside of the cage member 23 and can shift radially as a unit with the packing.

The seal shown in Fig. 7 differs from that shown in Figs. 4, 5 and 6 in that the coil spring is omitted and the fingers 30 of the pressure localizing member 31 are made as springs and serve the purpose of the coil spring.

The seal shown in Figs. 8, 9 and 10 differs from the seal shown in Fig. 7 in that the spacing ring is omitted and the radially flanged portion 32 of the packing is held against the bottom of the cage member 33 by spring fingers 34 on the pressure-localizing member 35, which fingers bear resiliently against the washer 36 and are arranged circumferentially of the pressure-localizing member in alternation with the inwardly bent spring fingers 37 which serve to localize the spring pressure at a point adjacent the edge of the axially sleeved portion 38 of the packing.

I claim:

1. In a seal, a flanged packing having an axially extending portion, an endless coil spring for constricting the packing about a shaft rotatable within the same, and means interposed between the spring and the packing for localizing the pressure of the spring at a point adjacent the edge of the axially extending portion of the packing.

2. In a seal, a flanged packing having an axially extending portion, a coil spring for constricting the packing about a shaft rotatable within the same, a pressure-localizing member having inwardly converging fingers interposed between the spring and the packing in engagement with the axially extending portion of the packing at a point adjacent the edge of the same for localizing the pressure of the spring at such point, and a hollow annular cage in which said packing, coil spring and pressure localizing member are housed.

3. As an article of manufacture, a self-contained seal for insertion as an assembled unit within a tubular housing in encompassing relation to a centrally located shaft, consisting of a flat centrally apertured sheet metal cup, an annular packing member having a flat radially extending portion and an axially extending portion, which packing member is positioned in the cup with the radially extending portion in extended surface contact with the bottom of the cup and with the axially extending portion projecting in the same direction as the rim of the cup, a flat clamping ring positioned in the cup against the radially extending portion of the packing in opposition to the bottom of the cup, a second centrally apertured sheet metal cup of slightly less diameter and depth than the first cup nested within the latter in inverted relation thereto with the rim of the second cup in abutment with the outer portion of the clamping ring and with the bottom of the second cup substantially even with the rim of the first cup, a spun-over edge on the rim of the first cup in engagement with the outer portion of the bottom of the second cup, and spring actuated means positioned in the annular space between the second cup and the axially extending portion of the packing member for constricting the free edge of the axially extending portion of the packing member.

4. As an article of manufacture, a self-contained seal for insertion as an assembled unit within a tubular housing in encompassing relation to a centrally located shaft, consisting of a flat centrally apertured sheet metal cup, an annular packing member having a flat radially extending portion and an axially extending portion, which packing member is positioned in the cup with the radially extending portion in extended surface contact with the bottom of the cup and with the axially extending portion projecting in the same direction as the rim of the cup, a flat clamping ring positioned in the cup against the radially extending portion of the packing in opposition to the bottom of the cup, a second centrally apertured sheet metal cup of slightly less diameter and depth than the first cup nested within the latter in inverted relation thereto with the rim of the second cup in abutment with the outer portion of the clamping ring and with the bottom of the second cup substantially even with the rim of the first cup, a spun-over edge on the rim of the first cup in engagement with the outer portion of the bottom of the second cup, and a spring positioned in the annular space between the second cup and the axially extending portion of the packing member for constricting the latter.

In testimony whereof I have hereunto subscribed my name.

HAROLD A. CLARK.

DISCLAIMER 1,819,871.—*Harold A. Clark*, Northbrook, Ill. OIL SEAL. Patent dated August 18, 1931. Disclaimer filed October 28, 1935, by the assignee, *Chicago Rawhide Manufacturing Company*.

Hereby enters this disclaimer to those claims of the specification of said Letters Patent which are as follows:

"3. As an article of manufacture, a self-contained seal for insertion as an assembled unit within a tubular housing in encompassing relation to a centrally located shaft, consisting of a flat centrally apertured sheet metal cup, an annular packing member having a flat radially extending portion and an axially extending portion, which packing member is positioned in the cup with the radially extending portion in extended surface contact with the bottom of the cup and with the axially extending portion projecting in the same direction as the rim of the cup, a flat clamping ring positioned in the cup against the radially extending portion of the packing in opposition to the bottom of the cup, a second centrally apertured sheet metal cup of slightly less diameter and depth than the first cup nested within the latter in inverted relation thereto with the rim of the second cup in abutment with the outer portion of the clamping ring and with the bottom of the second cup substantially even with the rim of the first cup, a spun-over edge on the rim of the first cup in engagement with the outer portion of the bottom of the second cup, and spring actuated means positioned in the annular space between the second cup and the axially extending portion of the packing member for constricting the free edge of the axially extending portion of the packing member.

"4. As an article of manufacture, a self-contained seal for insertion as an assembled unit within a tubular housing in encompassing relation to a centrally located shaft, consisting of a flat centrally apertured sheet metal cup, an annular packing member having a flat radially extending portion and an axially extending portion, which packing member is positioned in the cup with the radially extending portion in extended surface contact with the bottom of the cup and with the axially extending portion projecting in the same direction as the rim of the cup, a flat clamping ring positioned in the cup against the radially extending portion of the packing in opposition to the bottom of the cup, a second centrally apertured sheet metal cup of slightly less diameter and depth than the first cup nested within the latter in inverted relation thereto with the rim of the second cup in abutment with the outer portion of the clamping ring and with the bottom of the second cup substantially even with the rim of the first cup, a spun-over edge on the rim of the first cup in engagement with the outer portion of the bottom of the second cup, and a spring positioned in the annular space between the second cup and the axially extending portion of the packing member for constricting the latter."

[*Official Gazette November 19, 1935.*]